United States Patent Office 3,575,992
Patented Apr. 20, 1971

3,575,992
VAPOR PHASE PRODUCTION OF DICHLOROCYANOPYRIDINES
William H. Taplin III, Lafayette, Calif., assignor to The Dow Chemical Company, Midland, Mich.
No Drawing. Continuation-in-part of application Ser. No. 666,474, Sept. 8, 1967, now Patent No. 3,420,833, which is a continuation-in-part of application Ser. No. 321,283, Nov. 4, 1963. This application Jan. 6, 1969, Ser. No. 789,373
The portion of the term of the patent subsequent to May 17, 1983, has been disclaimed and dedicated to the Public
Int. Cl. C07d 31/46
U.S. Cl. 260—294.9
8 Claims

ABSTRACT OF THE DISCLOSURE

Dichlorocyanopyridines are prepared by the reaction of chlorine and a monocyanopyridine or the monochloro derivatives thereof in a process which comprises introducing a monocyanopyridine, usually carried in a substantially inert diluent, both being in the vapor phase, into a reaction zone and contacting this mixture in a rapid turbulent mixing step with at least two moles of chlorine per mole monocyanopyridine. The reaction zone is maintained at a temperature in the range of from about 400° C. to about 550° C.

CROSS REFERENCE TO RELATED APPLICATION

This application is a continuation-in-part of my copending application Ser. No. 666,474, filed Sept. 8, 1967, now U.S. Pat. No. 3,420,833, issued Jan. 7, 1969, which is in turn a continuation-in-part of my application Ser. No. 321,283, filed Nov. 4, 1963, now abandoned.

BACKGROUND OF THE INVENTION

Monocyanopyridines substituted with two chlorine atoms are known compounds and are useful as pesticides and are adapted to be employed for the control of plant and water infesting pests such as plum curculio, southern army worm, two-spotted spider mite, lake emerald shiner and others. The methods by which they have heretofore been made are cumbersome and generally require a number of steps resulting in low overall conversions. It has not previously been recognized that these compounds can be made by vapor phase chlorination. It is clearly seen that there is a need for a simple, direct method for producing dichlorinated products of monocyanopyridines or the monochloro-derivatives thereof.

It is an object of the present invention to provide a method for the chlorination of monocyanopyridine compounds to produce dichlorinated monocyanopyridines whereby formation of substantial quantities of degradative by-products may be avoided and whereby tar formation is substantially completely avoided. It is another object of the present invention to provide a method whereby dichlorinated monocyanopyridines may be prepared substantially as a single or major component of a reaction product composition or may be prepared in such amounts as to make recovery of such dichlorinated products practicable as a production method. It is a further object of the present invention to selectively produce a readily recoverable dichlorinated cyanopyridine product.

SUMMARY OF THE INVENTION

According to the present invention, it has been discovered that monocyanopyridines and the monochloroderivatives thereof may be chlorinated to produce dichlorinated monocyanopyridines substantially free of tarry by-products in a method whereby vapors of an appropriate monocyanopyridine, usually in admixture with a diluent, are rapidly and turbulently mixed with an excess of gaseous chlorine. It has further been discovered that two chlorine atoms may be introduced into a monocyanopyridine ring or one chlorine atom into a monochloroderivative thereof while avoiding the formation of degradative by-products in a method which comprises vaporizing a monocyanopyridine reactant and mixing the resulting vapor mixture with an excess of gaseous chlorine at elevated temperatures.

Representative monocyanopyridines are those wherein the cyano grouping is in the 2-, 3-, or 4-position and includes those containing one chlorine atom in any desirable position on the ring. Hereinafter, the terms "monocyanopyridine," "monocyanopyridines" or "'monocyanopyridine reactant" will be used to identify both the unsubstituted and monochloro-substituted reactants.

Diluents suitable for carrying out the process of the present invention are materials substantially inert to or not detrimentally reactive with the reactants and/or product, particularly the chlorine reactant under the reaction conditions employed. Representative operable diluents include for example, water, carbon tetrachloride, trichloromethane, dichloromethane and the like with carbon tetrachloride being preferred. Although a diluent of the type set forth hereinbefore is preferred, a diluent does not necessarily have to be employed. In effect, an excess of the chlorine reactant itself, greater than set forth hereinafter, can be used as the reaction medium or carrier.

In carrying out the process of the present invention, mixed vapors of a monocyanopyridine reactant and an appropriate diluent, if employed, are rapidly and turbulently mixed during a brief contact time at temperatures of from about 400° C. to about 550° C., with an excess of gaseous chlorine over the stoichiometric amount required for preparing the dichloromonocyanopyridine product. It is critical and essential for the production of the desired products and avoidance of extensive degradation and tar formation that there be rapid and turbulent mixing of the reactants. It is further essential that the process be carried out in a manner that the heterocyclic compound be contacted with excess chlorine. Generally, there should be provided from about 2 to about 30 or more moles of chlorine per mole of monocyanopyridine reactants in the initial reaction mixture. The preferred ratio is from about 5 to about 30 moles of chlorine per mole of monocyanopyridine reactant. It is among the advantages of the present process that when the reactants and diluents are mixed in the specified manner an exothermic, homogeneous reaction ensues. Thus, the reaction proceeds to good yields of desired products without the need for catalysts.

Preferred conditions for carrying out the reaction include a temperature of about 400° C. to about 500° C.

Although the exact residence time is not critical, the reactants should not be permitted to remain in contact for a prolonged period. The contact period or residence time depends on the temperature within the operable ranges of temperature for particular products. Thus, lowering the temperature ten degrees may double the permissible residence time but will ultimately be limited by the operable range for obtaining a particular product. Residence time generally will not exceed 50 seconds. The preferred time for contact is from about 5 to 20 seconds.

Operating perssures are not critical and may vary from subatmospheric to somewhat superatmospheric. Atmospheric pressure is satisfactory and is preferred.

In carrying out the reaction, ordinarily a monocyanopyridine reactant and diluent are first introduced into an evaporator to produce a vaporized mixture of the heterocyclic nitrogen compound in the diluent. The evaporator is maintained at a temperature at which rapid vaporization occurs, usually in the range of from about 220°

C. to about 270° C., preferably from about 10° to 50° C. above the boiling point of the monocyanopyridine. Any suitable vaporizing device may be employed as evaporator but a wiped film evaporator has been found to be convenient. For efficient operation it is necessary that the rate of introduction and/or temperature of the evaporator be maintained so as to completely vaporize the cyanopyridine reactant and maintain the compound in the vaporized state. It has been noted that incomplete vaporization results in decreased yield of the desired dichlorinated cyanopyridine compound. The mixed vapors which are produced are conducted from the evaporator and rapidly and turbulently mixed with the gaseous chlorine. Preferably, the mixing occurs at a point just prior to the point of entry to the reactor, and the resulting gaseous mixture is conducted at a rapid rate in a turbulent flow into the hot reactor where, in the vapor phase, a reaction takes place in the temperature range of from about 400° C. to about 550° C. with the formation of the desired dichlorocyanopyridine. In one preferred embodiment the mixing of reactants is accomplished in a nozzle which injects the mixture into the reactor. Alternatively, the mixed vapors of monocyanopyridine reactant and diluent and the gaseous chlorine may be simultaneously but separately introduced into the reactor, but in such case, the gaseous chlorine may be jetted in at a point close to the point of introduction of the heterocyclic nitrogen compound in such manner to ensure very rapid mixing and turbulent flow of the reactants. The turbulence must be such as to provide a Reynolds number of at least 800. The preferred Reynolds number is about 2000. Generally, an inlet vapor velocity of about 1600 to 2200 centimeters per second is considered desirable. If desired, the reactor may be insulated to permit reaction to take place under adiabatic conditions, but this is not essential in the practice of the instant process. The vapors passing from the reactor are cooled or quenched to separate (a) a liquid mixture comprising chlorinated cyanopyridine hydrochloride salt products, diluent and reacted or partially reacted monocyanopyridine hydrochloride from (b) a gaseous mixture comprising chlorine and hydrogen chloride by-product. The liquid mixture is base neutralized and may be fractionally distilled to recover the desired products in substantially pure form or may be cooled to precipitate the product which is then recovered by filtration and the filtrate recycled to the evaporator preheater for further reaction. The gas mixture may be scrubbed according to conventional procedures to separate chlorine from hydrogen chloride. The former may be dried and recycled while the latter may be recovered for example, as aqueous hydrochloric acid. The dichloromonocyanopyridine product whether recovered by distillation, precipitation or by filtration may be further purified, if desired, by methods well-known to the skilled in the art.

Any suitable reactor may be employed, however, the reactor preferably is designed to prevent or minimize back-mixing of the chlorinated products with the unreacted monocyanopyridine reactant. Since the reaction is not strongly exothermic, heating is required particularly at the initiation of the reaction. Thereafter heat input is only necessary to compensate for heat loss to the environment. The inlets, outlets and interior surfaces of the reactor should be of materials such as are known to resist corrosion by chlorine and hydrogen chloride at high temperatures. Thus, for example, such surfaces may be lined with nickel, carbon, silica or glass. In practice, it has been found that thermally resistant, high-silica glass such as Vycor brand is satisfactory for small reactors. In large scale apparatus, it is convenient to employ a shell of nickel lined with fused silica or a suitable refractory such as carbon. To accomplish the essential rapid, turbulent mixing and introduction of the reactants into the reaction zone, the reactor may be fitted with a mixing nozzle, as described above, for introducing the reactants with substantially simultaneous mixing. Alternatively, the organic reactant plus diluent and the chlorine may be introduced into the reactor by separate but closely adjacent orifices adjusted so that the chlorine is jetted into the incoming stream of organic reactants plus diluent. In a further embodiment wherein the monocyanopyridine, diluent and chlorine are introduced into the reactor with mixing immediately prior to such introduction, the mixing and introduction are carried out in a tube or the like of a diameter which is small in relation to the diameter of the reactor whereby turbulence at the entrance is achieved at relatively low Reynolds numbers in accordance with known principles. In a preferred form of apparatus the reactor proper is in the form of a cylinder having a length of 5 times the diameter. Conventional accessories, such as flowmeters on the inputs and condensor, cooling tubes or a quench tower for the exit gases, are employed.

In a preferred method for carrying out the process according to the present invention, a mixture of a monocyanopyridine reactant and chlorohydrocarbon diluent is introduced into a wiped film evaporator where the reactant and diluent are vaporized, the vapors are rapidly mixed with gaseous chlorine within the reactant ratio set forth hereinbefore and introduced into a heated reactor at high turbulence and reacted within a temperature range of from about 400° C. to about 550° C. thereby to produce the desired dichlorocyanopyridines. The mixture of desired product and any unreacted starting material or by-product, such as hydrogen chloride, is conducted from the reactor, condensed to separate the desired product from volatile by-products and the product recovered from the liquid condensate by conventional procedures.

DESCRIPTION OF THE PREFERRED EMBODIMENTS

The following examples illustrate the invention but are not to be construed as limiting:

Example 1.—A cylinder of Vycor high-silica glass of 3.5 inch diameter and about 18 inches in length was tapered to inlet and outlet tubes and fitted with electrical heating coils and efficient insulation to serve as a reactor having a capacity of about 1.35 liters. The outlet was connected to a coolable collection vessel and the latter was vented through a reflux condenser to an acid-gas recovery system. The inlet tube ended in a nozzle projecting about 1 inch into the reactor and having an opening into the reactor 0.25 centimeter in diameter. Inside the nozzle was a smaller concentric tube for chlorine introduction ending 0.5 inch before said nozzle opening. The upstream end of the inlet tube connected to an electrically heated vaporizer-preheater tube for introduction of a cyanopyridine reactant and diluent.

A solution consisting of 5 percent by weight of 4-cyanopyridine and 95 percent by weight of carbon tetrachloride is metered into the vaporizer-preheater at a rate of about 6.36 grams per minute while the vaporizer is heated so that the resulting vapor mixture passes to the inlet nozzle at a temperature of about 270° C. In the nozzle the 4-cyanopyridine and diluent vapor are rapidly mixed with chlorine as the reactant mixture is forced through the nozzle into the reactor at a velocity of about 1820 centimeters per second. The chlorine is introduced at a rate to provide 14 moles of chlorine per mole of 4-cyanopyridine in the reaction mixture. The reaction is carried out at a reactor temperature of 450° C. with a residence time in the reactor of about 15 seconds and a total run time of 60 minutes. The hot effluent gases from the reactor are trapped in two consecutive Dry Ice traps. The excess chlorine, hydrogen chloride by-product and diluent are removed from the effluent by evaporating on a steam bath. The remaining solids are taken up with methylene dichloride and this solution passed over activated charcoal. The methylene dichloride is removed by evaporating on a steam bath leaving the crude 2,6-dichloro-4-cyanopyridine product in a yield of 36.6 grams. The product is analyzed by gas-liquid chromatography (G.L.C.)

and 2,6-dichloro-4-cyanopyridine is found to be present as 90 mole percent of the reaction product.

Example 2.—Using the apparatus and general procedure as described in Example 1, a solution of 4.9 percent by weight of 4-cyanopyridine in carbon tetrachloride is passed through the vaporizer at a temperature range of from 220° to 270° C. The resulting vapor mixture is mixed in the nozzle with 13 moles of chlorine per mole of 4-cyanopyridine and passed into the reactor at a nozzle velocity of about 2115 centimeters per second. The reaction is carried out at a reactor temperature of 500° C. with a residence time of 13 seconds and a total run time of 62 minutes to produce a crude product in a yield of 65 grams which upon G.L.C. analysis is found to consist predominantly of 2,6-dichloro-4-cyanopyridine. The feed rate for this reaction is 7.6 grams per minute and the chlorine rate is 3.35 grams per minute.

Example 3.—The apparatus and general procedure of Example 1 is employed with the following variables:

Cyanopyridine feed: solution of 10 percent by weight of 2-cyanopyridine in carbon tetrachloride.
Feed rate: 5.5 grams per minute.
Vaporizer temperature: ~270° C.
Molar ratio of chlorine/2-cyanopyridine: about 8.
Chlorine feed rate: 3.35 grams per minute.
Nozzle velocity: 1615 centimeters per second.
Reactor temperature: 400° C.
Residence time: ~17 seconds
Total run time: 60 minutes 48 grams of a crude product is obtained. Upon G.L.C. analysis, the product is found to consist of 4,6-dichloro-2-cyanopyridine in 20 percent yield.

Example 4.—The apparatus and general procedure of Example 1 is employed with the following variables:

Cyanopyridine feed: solution of 10 percent by weight of 2-cyanopyridine in carbon tetrachloride.
Feed rate: 5.5 grams per minute.
Vaporization temperature: ~270° C.
Molar ratio of chlorine/2-cyanopyridine: about 8.
Chlorine feed rate: 3.35 grams per minute.
Nozzle velocity: 1730 centimeters per second.
Reactor temperature: 450° C.
Residence time: ~16 seconds.
Total run time: 60 minutes.

58 grams of a crude product is obtained which upon analysis by G.L.C. is found to consist predominantly of 4,6-dichloro-2-cyanopyridine.

Example 5.—The apparatus and general procedure of Example 1 is employed with the following variables:

Cyanopyridine feed: solution of 10 percent by weight of 2-cyanopyridine in carbon tetrachloride.
Feed rate: 5.5 grams per minute.
Vaporization temperature: ~270° C.
Molar ratio of chlorine/2-cyanopyridine: about 7.
Chlorine feed rate: 3.35 grams per minute.
Nozzle velocity: 1860 centimeters per second.
Residence time: ~15 seconds.
Reactor temperature: 500° C.
Total run time: 60 minutes.

73 grams of the crude 4,6-dichloro-2-cyanopyridine product is obtained and G.L.C. analysis confirms that 4,6-dichloro-2-cyanopyridine is the major component.

Example 6.—The apparatus and general procedure of Example 1 is employed with the following variables:

Cyanopyridine feed: solution of 10 percent by weight of 3-cyanopyridine in carbon tetrachloride.
Feed rate: 6.66 grams per minute.
Vaporization temperature: ~270° C.
Molar ratio of chlorine/3-cyanopyridine: ~7.
Chlorine feed rate: 3.35 grams per minute.
Nozzle velocity: 1730 centimeters per second.
Residence time: ~16 seconds.
Reactor temperature: 400° C.
Total run time: 60 minutes.

65 grams of a crude product is obtained which is found to contain 70 mole percent 2,6-dichloro-3-cyanopyridine when analyzed by G.L.C.

Example 7.—In a run caried out in a fashion similar to Example 6, using a reactor temperature of 450°, a nozzle velocity of 1860 centimeters per second and a residence time of 15 seconds, good yields of 2,6-dichloro-3-cyanopyridine are obtained.

The moncyanopyridines employed as starting materials are commercially available and can be prepared by the ammoxidation method described in Chemical Engineering Progress, September 1964, pages 48–49.

Example 8.—In a run carried out in a fashion similar to Example 7, good conversion to 2,6-dichloro-3-cyanopyridine is obtained when water is used as the solvent.

Example 9.—In a run carried out in a fashion similar to Example 7, good conversion to 2,6-dichloro-3-cyanopyridine is obtained when no solvent is used and the molar ratio of chlorine is about 15 moles per mole of 3-cyanopyridine.

What is claimed is:

1. A process for the production of a dichlorocyanopyridine which comprises rapidly mixing in a turbulent flow, chlorine and a vaporized monocyanopyridine reactant from the group consisting of 2-cyanopyridine, 3-cyanopyridine and 4-cyanopyridine at a temperature within the range of from about 400° to about 550° C. and wherein the chlorine and monocyanopyridine reactants are present in a molar ratio of from about 2 to 30 moles of chlorine per mole of monocyanopyridine and including the step of recovering the resulting dichloromonocyanopyridine product.

2. The process of claim 1 wherein the molar ratio of said chlorine and monocyanopyridine reactant is in the range of from about 5 to about 30.

3. The process of claim 1 wherein the monocyanopyridine reactant is carired in a chlorinated hydrocarbon diluent and the reaction temperature range is from about 400° to about 500° C.

4. The process of claim 1 wherein the chlorinated hydrocarbon diluent is carbon tetrachloride.

5. The process of claim 1 wherein when 2-cyanopyridine is the monocyanopyridine employed, the product is 4,6-dichloro-2-cyanopyridine.

6. The process of claim 1 wherein when 3-cyanopyridine is the monocyanopyridine employed, the product is 2,6-dichloro-3-cyanopyridine.

7. The process of claim 1 wherein when 4-cyanopyridine is the monocyanopyridine employed, the product is 2,6-dichloro-4-cyanopyridine.

8. The process of claim 1 and including the steps of cooling the product thereby to condense said dichloromonocyanopyridine and separating said dichloromonocyanopyridine from gaseous by-product.

References Cited
UNITED STATES PATENTS 3,420,833  1/1969  Taplin _____ 260—283

ALAN L. ROTMAN, Primary Examiner

U.S. Cl. X.R.

260—999